(12) United States Patent
Song

(10) Patent No.: US 6,447,039 B1
(45) Date of Patent: Sep. 10, 2002

(54) PICK UP TRUCK

(75) Inventor: Dae Sub Song, Gyeonggi-do (KR)

(73) Assignee: Kia Motors Corporation, Seoul (KR)

( * ) Notice: Subject to any disclaimer, the term of this patent is extended or adjusted under 35 U.S.C. 154(b) by 0 days.

(21) Appl. No.: 09/925,045

(22) Filed: Aug. 7, 2001

(30) Foreign Application Priority Data

Dec. 13, 2000 (KR) ............................................. 00-75757
Dec. 13, 2000 (KR) ............................................. 00-75758

(51) Int. Cl.$^7$ ................................................ B60N 3/12
(52) U.S. Cl. ................................ 296/37.6; 296/100.07; 296/165; 224/404
(58) Field of Search ............................ 296/37.6, 100.07, 296/100.06, 100.18, 165, 100.02; 224/404

(56) References Cited

U.S. PATENT DOCUMENTS

| | | | | |
|---|---|---|---|---|
| 1,838,344 A | * | 12/1931 | Wilson ........................ | 296/37.6 |
| 2,530,097 A | * | 11/1950 | Troth ........................... | 296/24.1 |
| 3,169,792 A | * | 2/1965 | Viquez ........................ | 296/26.11 |
| 3,240,527 A | * | 3/1966 | Weiss et al. ................ | 296/37.8 |
| 3,770,312 A | * | 11/1973 | Shadburn ................... | 296/146.16 |
| 4,480,868 A | * | 11/1984 | Koto ........................... | 296/190.11 |
| 4,613,183 A | * | 9/1986 | Kesling ...................... | 296/183 |
| 4,941,702 A | * | 7/1990 | Southward ................. | 296/37.6 |
| 5,263,757 A | * | 11/1993 | Reed ........................... | 296/37.6 |
| 5,524,951 A | * | 6/1996 | Johnson ...................... | 296/37.6 |
| 5,934,727 A | * | 8/1999 | Storc et al. ................. | 296/37.6 |
| 6,186,575 B1 | * | 2/2001 | Fisher et al. ................ | 296/37.6 |
| 6,234,560 B1 | * | 5/2001 | Hunt ........................... | 296/100.07 |

* cited by examiner

Primary Examiner—Kiran Patel
(74) Attorney, Agent, or Firm—Christie, Parker & Hale, LLP

(57) ABSTRACT

A pick up truck is disclosed, in which a longer cargo can stably be loaded as the case may be by increasing the size of a cargo box. The pick up truck includes: a cab portion (10) driven by an engine and provided with seats at the front to allow a driver and passengers to ride thereon, having a top portion covered with a loop panel (11); a cargo load (20) having a load floor (21) extended toward a rear end of the cab portion (10), for loading various cargos on the load floor (21); a cab panel member (30) and a box panel member (40) raised between the cab portion (10) and the cargo load (20) to divide the cab portion (10) and the cargo load (20), having a back glass to see the rear; and a box panel switch for switching the box panel member (40) to connect the cab portion (10) with the cargo load (20), so that an opening (100) is formed to extend the cargo load (20), wherein the box panel switch separates the cab panel member (30) from the box panel member (40), so that hinges (31) and (41) are formed to allow the cab panel member (30) and the box panel member (40) to be respectively folded toward an inner side of the cab portion (10), the box panel member 40 having a panel member supporting (50) for raising the cab portion (10) and the cargo load (20) to compartment them, thereby maintaining and fixing the raised state.

7 Claims, 4 Drawing Sheets

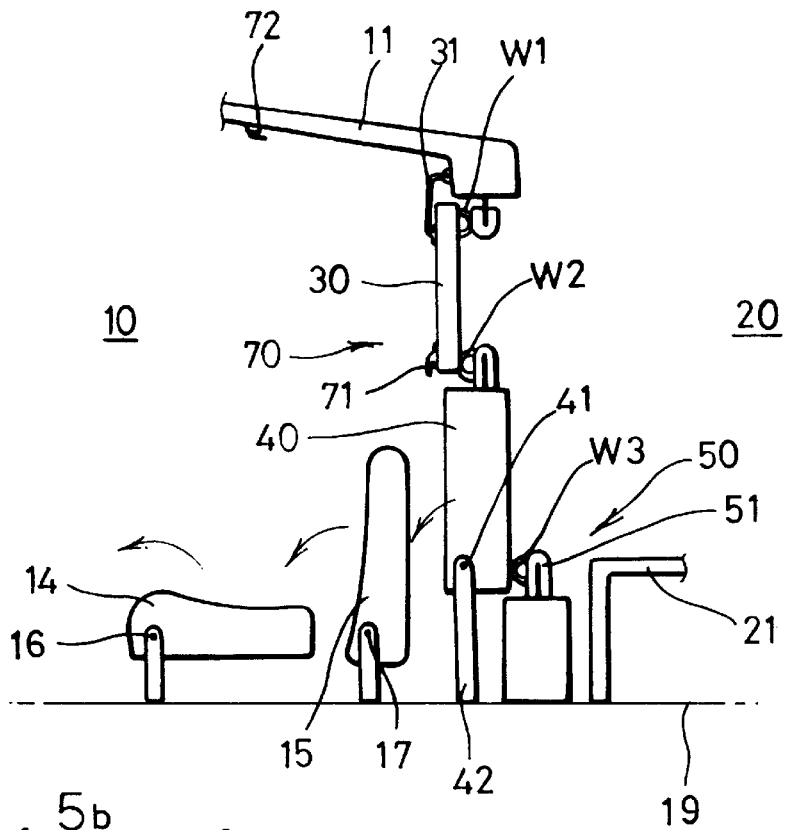
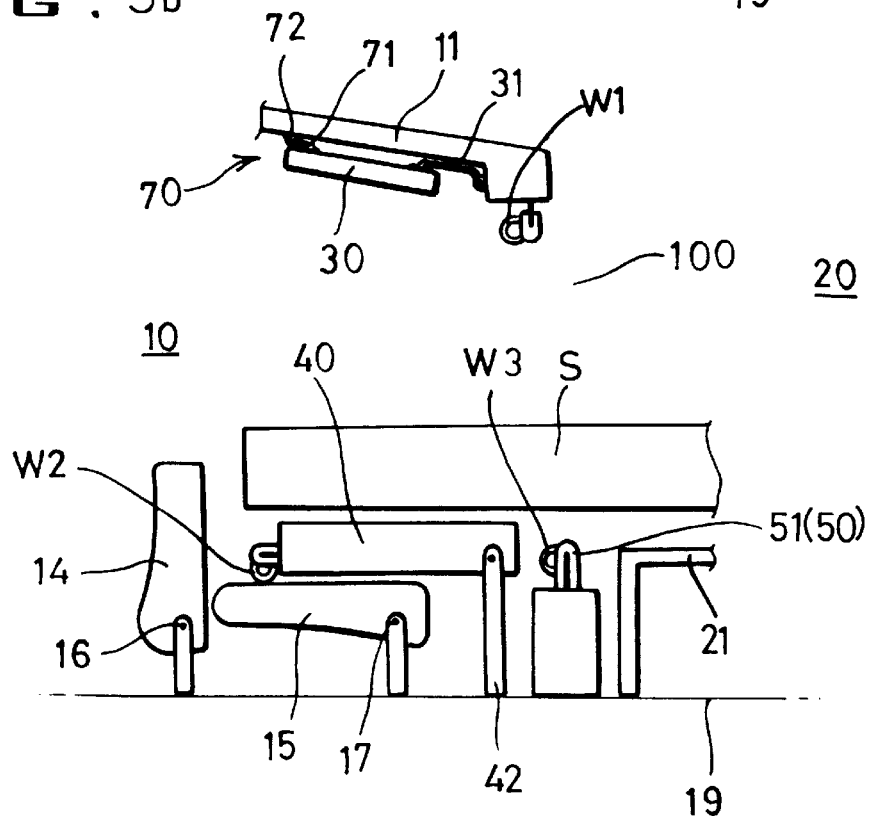

PICK UP TRUCK

CROSS-REFERENCE TO RELATED APPLICATIONS

This application claims priority of Korea patent Application No. 2000-75757, filed on Dec. 13, 2000, and Korea patent Application No. 2000-75758, filed on Dec. 13, 2000.

FIELD OF THE INVENTION

1. Field of the Invention

The present invention relates to a pick up truck that transports light cargo, and more particularly, to a pick up truck that can stably load a longer cargo by increasing the size of a cargo box.

2. Discussion of the Related Art

FIG. 1 is a perspective view illustrating a rear side structure of a related art pick up truck. Referring to FIG. 1, the related art pick up truck includes a cab portion 1 for carrying passengers and a cargo box 2 for carrying cargo. A side wall 4 is compartmented between the cab portion 1 and the cargo box 2. The side wall 4 is provided with a glass window 3 to allow a driver to ensure a rear view through a room mirror (not shown).

The related art pick up truck cannot transport a longer cargo than the length of the cargo box 2. Therefore, to transport a longer cargo, although it is light, a truck more than a medium size has been required whether the cargo is light or heavy. This has increased the transport cost.

To solve such a problem, another type of pick up truck has been suggested as in U.S. Pat. No. 5,934,727. This related pick up truck is configured such that a longer cargo 6 than a cargo box 2 is loaded in or on a wheel cover 5 projected in the cargo box 2.

Such a pick up truck includes a cab portion 1, the cargo box 2, a box panel member 7, and a front side wall 8. The box panel member 7 is axially connected with the front side wall 8 of the cargo box 2 and is movable in a horizontal position.

Accordingly, the box panel member 7 is partially overlapped with the wheel cover 5 and is supported by the wheel cover 5.

Furthermore, when the box panel member 7 is in a horizontal position, the cargo box 2 includes a cargo box opening 9. Also, a cab panel member 9a is axially mounted in the cab portion 1 and is movable between a vertical closed state and a horizontal open state.

Therefore, when the cab panel member 9a is in the horizontal position and a cab opening 1a is partially aligned with the cargo box opening 9, the cab portion 1 has the cab opening 1a.

The related art pick up truck can increase the size of the cargo box by opening the cab panel member and the box panel member as the case may be so as to load a longer cargo. However, the related art pick up truck has several problems.

First, since the cab panel member and the box panel member separated from each other are unfolded toward the cargo box, the box panel member is put on the wheel cover. In this case, the box panel member does not require a separate support member but the cab panel member requires a relatively expensive shock absorber to maintain the horizontal state. This increases the production cost.

Furthermore, since the box panel member is put on the wheel cover, the box panel member is not flush with the bottom. This causes unstable load state in case of a longer cargo.

Finally, when the longer cargo is loaded, an unnecessary portion is formed between the wheel cover and the bottom of the cargo box, thereby reducing a practical load area.

SUMMARY OF THE INVENTION

Accordingly, the present invention is directed to a pick up truck that substantially obviates one or more of the problems due to limitations and disadvantages of the related art.

An object of the present invention is to provide a pick up truck in which a cab panel member and a box panel member can be folded toward a cab portion in a state where they are separated from each other, so that the box panel member is flush with a bottom surface of a cargo box.

Another object of the present invention is to provide a pick up truck in which a rear seat is not damaged even if a longer cargo is loaded in a state where a box panel member is folded.

Other object of the present invention is to provide a pick up truck in which a cab panel member is only folded toward a cab portion to conveniently open a cab opening, thereby ventilating the inside of the pick up truck.

Additional features and advantages of the invention will be set forth in the description which follows, and in part will be apparent from the description, or may be learned by practice of the invention. The objectives and other advantages of the invention will be realized and attained by the scheme particularly pointed out in the written description and claims hereof as well as the appended drawings.

To achieve these and other advantages and in accordance with the purpose of the present invention, as embodied and broadly described, a pick up truck according to the present invention includes: a cab portion driven by an engine and provided with seats at the front to allow a driver and passengers to ride thereon, having a top portion covered with a roof panel; a cargo load having a load floor extended toward a rear end of the cab portion, for loading various cargos on the load floor; a cab panel member and a box panel member raised between the cab portion and the cargo load to divide the cab portion and the cargo load, having a back glass to see the rear; and a box panel switch means for switching the box panel member to connect the cab portion with the cargo load, so that an opening is formed to extend the cargo load, wherein the box panel switch means separates the cab panel member from the box panel member, so that hinges are formed to allow the cab panel member and the box panel member to be respectively folded toward an inner side of the cab portion, the box panel member having a panel member supporting means for raising the cab portion and the cargo load to compartment them, thereby maintaining and fixing the raised state.

According to the preferred embodiment of the present invention, the cab panel member 30 and the box panel member 40 are separated from each other and folded toward an inner portion of the cab portion 10, it is convenient to use them.

Furthermore, since the cab panel member 30 and the box panel member 40 are not exposed toward a rear end of the cab portion 10, a desirable appearance can be obtained.

It is possible to prevent the cab panel member 30 and the box panel member 40 from moving and colliding against a cargo S even if load vibration occurs during driving of the pick up truck. It is possible to also prevent vibration noise from occurring.

Moreover, since the box panel member is flush with the bottom surface of the cargo box in a state where it is folded, it is convenient to load a longer cargo S and a rear seat is not damaged.

It is to be understood that both the foregoing general description and the following detailed description are exemplary and explanatory and are intended to provide further explanation of the invention as claimed.

BRIEF DESCRIPTION OF THE ATTACHED DRAWINGS

The invention will be described in detail with reference to the following drawings in which like reference numerals refer to like elements wherein.

Figure 4A:
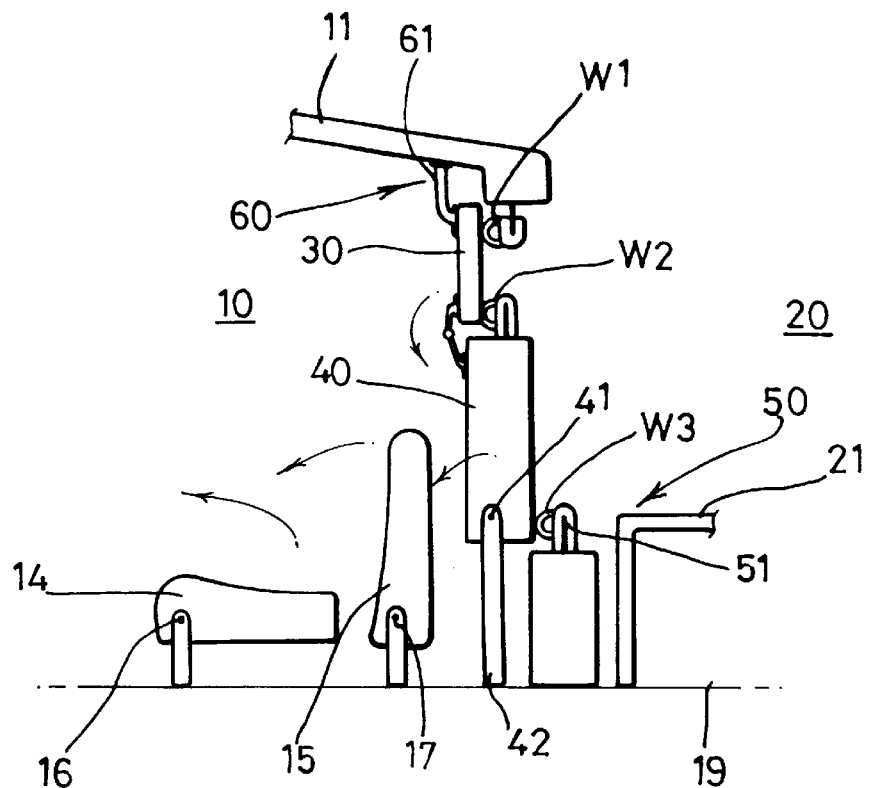
Figure 4B:
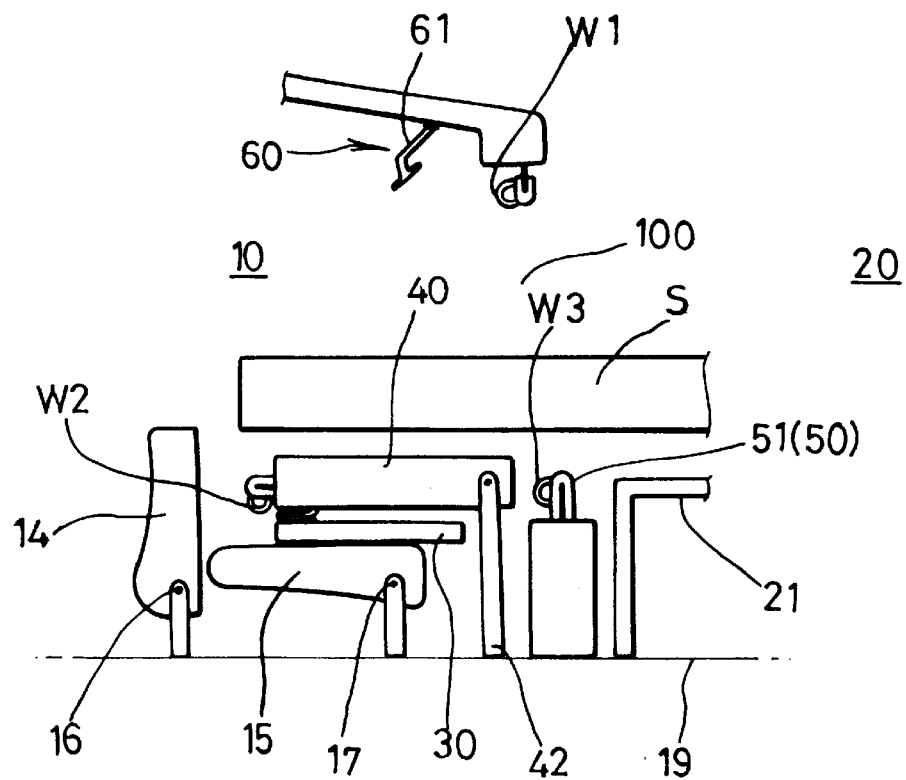

FIGS. 4A and 4B are longitudinal sectional views illustrating an operation state of a pick up truck in accordance with the first embodiment of the present invention, wherein FIG. 4a is a state view in which a cab opening and a cargo box opening are closed, and FIG. 4b is a state view in which a rear seat is folded and a cab opening and a cargo box opening are opened; and FIGS. 5A and 5B are longitudinal sectional views illustrating an operation state of a pick up truck in accordance with the second embodiment of the present invention, wherein FIG. 5a is a state view in which a cab opening and a cargo box opening are closed, and FIG. 5b is a state view in which a rear seat is folded and a cab opening and a cargo box opening are opened.

DETAILED DESCRIPTION OF THE PREFERRED EMBODIMENTS

Reference will now be made in detail to the preferred embodiments of the present invention, examples of which are illustrated in the accompanying drawings.

Figure 1:
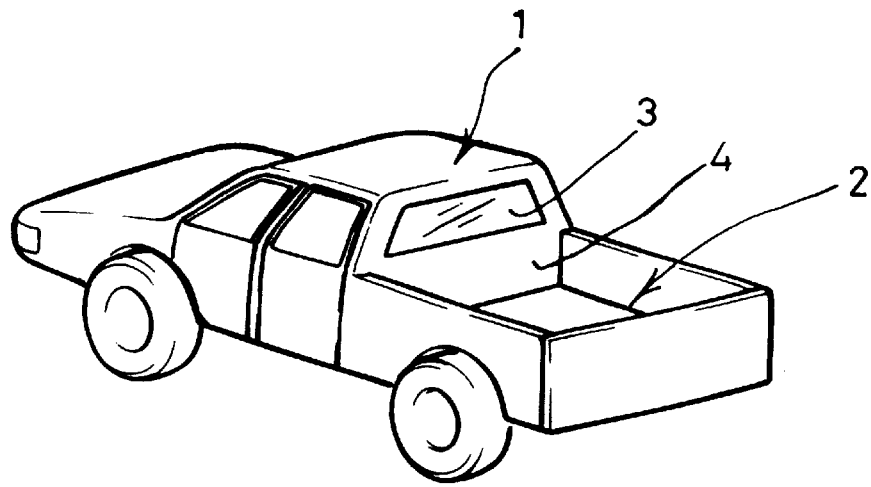
FIG. 1 is a perspective view illustrating a related art pick up truck.
Figure 2:
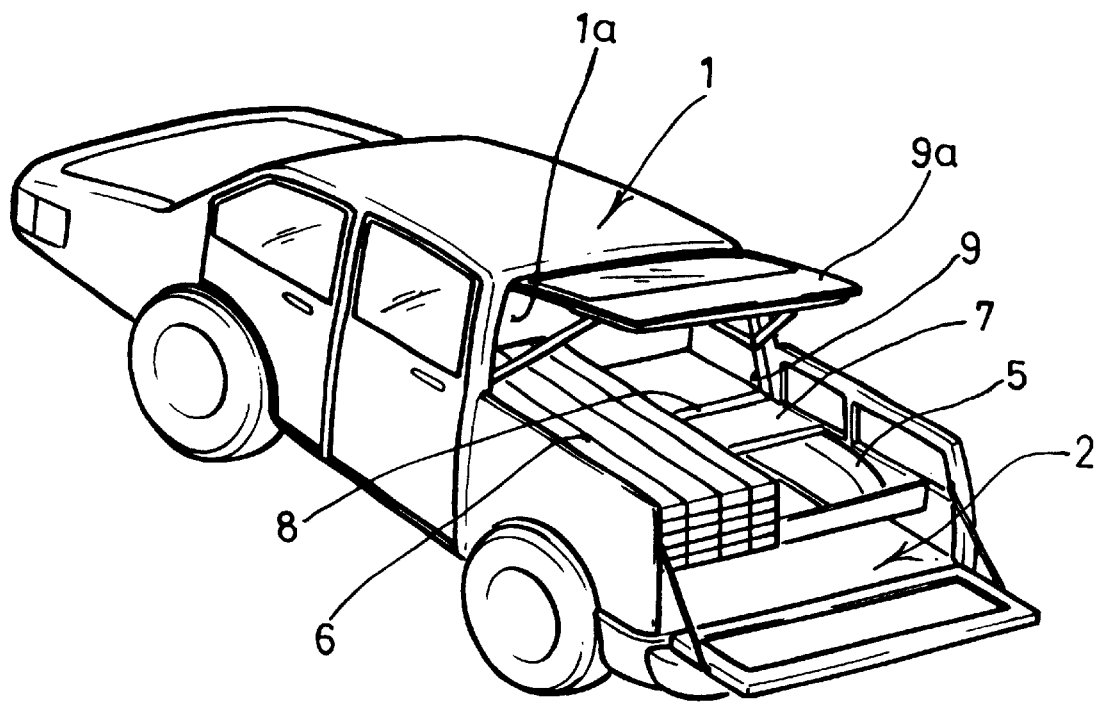
FIG. 2 is a perspective view illustrating an open state of a cab panel member in another related art pick up truck.
Figure 3:
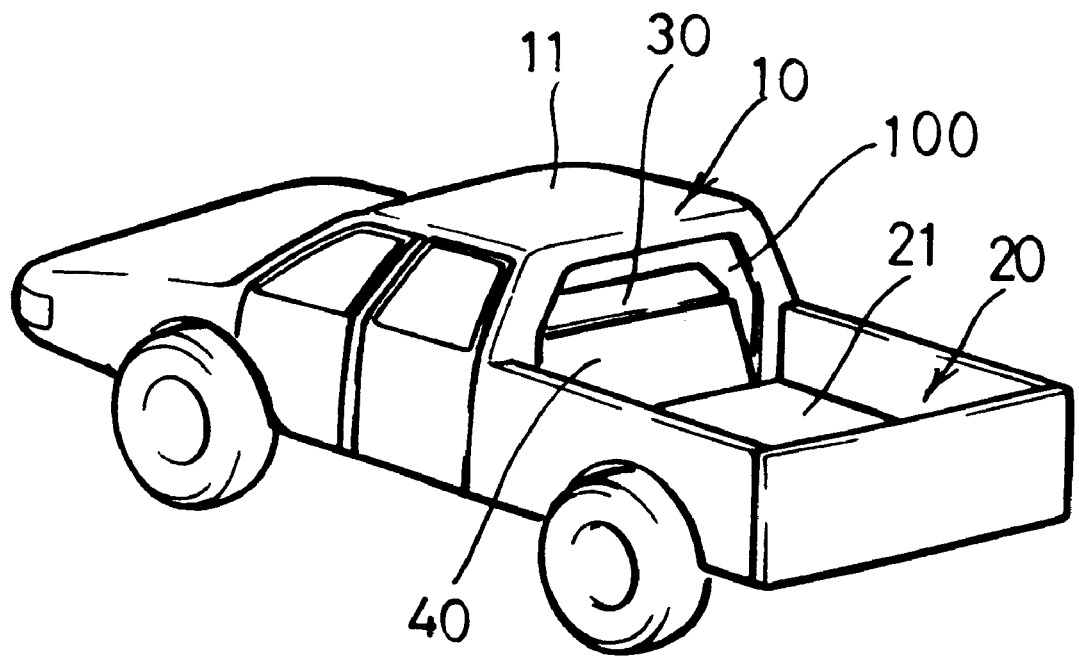
FIG. 3 is a perspective view illustrating a pick up truck in accordance with the present invention.

FIG. 3 is a perspective view illustrating a pick up truck in accordance with the present invention, in which a cab panel member 30 and a box panel member 40 are folded toward an inner portion of a cab portion 10 in a state where they are separated from each other.

FIGS. 4A and 4B illustrate a pick up truck in accordance with the first embodiment of the present invention. Referring to FIGS. 4A and 4B, the cab panel member 30 and the box panel member 40 are separated from each other and folded by a hinge at a boundary between them. In a lower portion of the box panel member 40, a hinge 41 is rotatably fixed to a supporter 42 at a bottom surface of the cab portion 10. Accordingly, to load a longer cargo S, as shown in FIG. 4B, the lower portion of the box panel member 40 is folded in a state where the cab panel member 30 is overlapped with the box panel member 40, so that an opening 100 is formed to connect a cargo load 20 with the cab portion 10.

Meanwhile, in a roof panel 11, the cab panel member 30 is maintained so as not to be folded in a vertically closed state and a cab panel member locking means 60 for releasing a locking state when the cab panel member 30 is folded is rotatably mounted.

In case where a seat is disposed at the rear of a driver s seat, a seat folding means should be provided so as not to affect movement of the box panel member 40.

In other words, a rear seat 14 and a seat back portion 15 disposed at the rear of the driver's seat in two rows are formed to be folded around pivot shafts 16 and 17. Thus, when the box panel member 40 is folded and rotated, the rear seat 14 is raised and the seat back portion 15 moves correspondingly, so that the box panel member 40 is folded to be put on the seat back portion 15, thereby extending the length of a cargo load 20 to the inner portion of the cab portion 10.

Furthermore, a panel member supporter 50 is provided on a bottom surface 19 of a cargo box to firmly maintain the state of the box panel member 40 raised to close the opening 100. That is to say, a stopper 51 is fixably mounted at one side of the box panel member 40 to firmly support the raised state of the box panel member 40 at one side opposite to a direction in which the box panel member 40 is folded.

Meanwhile, a weather strip w1 that maintains tightness with the cab panel member 30 is mounted at an end portion of the roof panel 11 so that rainwater is prevented from being entered into the cab portion 10 along edges of the cab panel member 30 and the box panel member 40 having mobility. Also, a weather strip w2 that maintains tightness with a contact portion between the cab panel member 30 and the box panel member 40 is mounted on the box panel member 40.

Furthermore, a weather strip w3 is mounted in a contact portion between the stopper 51 and the box panel member 40.

The operation of the aforementioned pick up truck according to the first embodiment of the present invention will now be described in more detail.

First, as shown in FIG. 4a, in a state where the cab panel member 30 and the box panel member 40 are maintained in a vertical direction, a boundary between the cab portion 10 and the cargo load 20 is cut off so that the opening 100 is closed.

At this state, in the same manner as a typical pick up truck, the cab portion 10 and the cargo load 20 are compartmented and a plurality of weather strips w1, w2, and w3 maintain tightness. Accordingly, it is possible to prevent any noise from occurring during driving of the pick up truck and to also prevent rainwater or dust from being entered into the cab portion 10.

Under the circumstances, to load a longer cargo S, the opening 100 in a closed state should be opened. To this end, as shown in FIG. 4a, the rear seat 14 which is unfolded is raised in an arrow direction to maintain a vertical state and at the same time the seat back portion 15 is pulled back counterclockwise so that it is folded toward the rear seat 14.

As described above, once the rear seat 14 and the seat back portion 15 are folded in such a manner that they are switched to each other, a locking member 61 of the cab panel member locking means 60 is separated and moved from its state which supports the inner side end of the cab panel member 30. Thus, the cab panel member locking means 60 is released.

The locking member 61 is swingably mounted at the base of the roof panel 11. The locking member 61 is configured to have more powerful fixed force at the location where it is closely contacted with the cab panel member 30 and the swing location at both ends where the close contact is released.

Next, the cab panel member 30 is closely contacted with the box panel member 40 by inwardly folding the cab panel member 30 connected with the box panel member 40 by a hinge 31. Then, the box panel member 40 is inwardly pushed, so that the box panel member 40 is put on the seat back portion 15 in a state where the box panel member 40 is overlapped with the cab panel member 30. As a result, as shown in FIG. 4b, the box panel member 40 is flush with a bottom surface of a load floor 21.

Therefore, the opening 100 closed by the cab panel member 30 and the box panel member 40 is opened, so that the longer cargo S can stably be loaded using an upper surface of the box panel member 40 and the load floor 21.

When it is not necessary to load the longer cargo, the box panel member 40 and the cab panel member 30 are raised contrary to the above operation and the locking member 61 of the cab panel member locking means 60 moves to support the inner side end of the cab panel member 30.

Then, the rear seat 14 and the seat back portion 15 are returned to their original location so that the inner portion of the cab portion 10 is sealed and the cargo load 20 is compartmented.

FIGS. 5A and 5B illustrate another pick up truck according to the second embodiment of the present invention. Referring to FIGS. 5A and 5B, a cab panel member 30 is closely contacted with the base of a roof panel 11 in a state where a cab panel member 30 and a box panel member 40 are completely separated from each other. The box panel member 40 moves to be put on a portion where a rear seat 14 and a seat back portion 15 are folded, so as to form an opening 100.

In other words, in a state where the cab portion 10 and the cargo load 20 are compartmented, the cab panel member 30 and the box panel member 40 are separated from each other in a horizontal direction. The cab panel member 30 is formed to be folded together with an end of the roof panel 11 by a hinge 31A while the box panel member 40 is formed to be folded with a supporter 42 raised on a bottom surface 19 of a cargo box by a hinge 41.

A fixing means 70 consisting of a pair of hooks 71 and 72 is mounted in the roof panel 11 to maintain the opening 100 in an open state in a state where the cab panel member 30 is tightly folded.

Also, in a case where a seat is disposed at the rear of a driver's seat, a seat folding means is provided so as to affect movement of the box panel member 40 in the same manner as the first embodiment.

In other words, the rear seat 14 and the seat back portion 15 disposed at the rear of the driver's seat in two rows are mounted to be folded around pivot shafts 16 and 17. Thus, when the box panel member 40 is folded and rotated, the rear seat 14 is raised and the seat back portion 15 moves correspondingly, so that the box panel member 40 is folded to be put on the seat back portion 15, thereby extending the length of the cargo load 20 to the inner portion of the cab portion 10.

Furthermore, in the same manner as the first embodiment, a panel member supporter 50 is provided on the bottom surface 19 of the cargo box to firmly maintain the state of the box panel member 40 raised to close the opening 100. That is to say, a stopper 51 is fixably mounted at one side of the box panel member 40 to support the raised state of the box panel member 40.

Thus, the stopper 51 firmly supports the raised state of the box panel member 40 at one side opposite to a direction in which the box panel member 40 is folded.

Meanwhile, a weather strip w1 that maintains tightness with the cab panel member 30 is mounted at an end portion of the roof panel 11 so that rainwater is prevented from being entered into the cab portion 10 along edges of the cab panel member 30 and the box panel member 40 having mobility.

Also, a weather strip w2 that maintains tightness with a contact portion between the cab panel member 30 and the box panel member 40 is mounted on the box panel member 40.

Furthermore, a weather strip w3 is mounted in a contact portion between the stopper 51 and the box panel member 40.

The operation of the aforementioned pick up truck according to the second embodiment of the present invention will now be described in more detail.

First, as shown in FIG. 5a, in a state where the cab panel member 30 and the box panel member 40 are maintained in a vertical direction, the opening 100 is closed. In this case, the cab portion 10 and the cargo load 20 are compartmented like a typical pick up truck. Tightness is maintained between the cab panel member 30 and the box panel member 40 by means of several weather strips w1, w2, and w3. Therefore, it is possible to prevent any noise from occurring during driving of the pick up truck and to also prevent rainwater or dust from being entered into the cab portion 10.

Under the circumstances, to load a longer cargo S, the opening 100 in a closed state should be opened. To this end, as shown in FIG. 5a, the rear seat 14 which is unfolded is raised in an arrow direction to maintain a vertical state and at the same time the seat back portion 15 is pulled back counterclockwise so that the seat back portion 15 is folded toward the rear seat 14.

As described above, once the rear seat 14 and the seat back portion 15 are folded, the cab panel member 30 is inwardly raised and is closely fixed to the roof panel 11 by the fixing means 70. Then, the box panel member 40 is inwardly pushed, so that the box panel member 40 is put on the seat back portion 15. Therefore, as shown in FIG. 5b, the box panel member 40 is flush with a bottom surface of a load floor 21. As a result, the longer cargo can stably be loaded using the box panel member 40 and the load floor 21.

In the second embodiment of the present invention, the rear seat 14 and the seat back portion 15 are only folded in a state where the cab panel member 30 is not opened. Thus, the box panel member 40 is only folded toward the cab portion 10 to load the longer cargo. Alternatively, the cab panel member 30 is only folded toward the inner side of the cab portion 10 to ventilate the inner portion during driving of the pick up truck.

As aforementioned, the pick up truck according to the present invention has the following advantages.

First, since the cab panel member and the box panel member are separated from each other and folded toward the cab portion, a desirable appearance and a simple structure can be obtained, thereby saving the production cost.

Second, the box panel member is put on the folded seat back portion so that it is flush with the bottom surface of the cargo box. Accordingly, it is convenient to stably load the longer cargo.

Third, since the longer cargo is put on the rear side of the box panel member in a state where the seat back portion is folded, a rear seat is not damaged.

Finally, since the seat back portion is mounted at the rear seat, it is possible to prevent a passenger sit on the rear seat from spring out of the truck through the cab opening and the opening of the cargo box even if any crash occurs.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A pick up truck comprising:
    a cab portion driven by an engine and provided with a driver's seat at the front and having a top portion covered with a roof panel;
    a cargo load having a load floor extended toward a rear end of the cab portion, for loading various cargos on the load floor;
    a cab panel member and a box panel member having a first position wherein the cab panel member and the box panel member divide the cab portion and the cargo load, and
    means for permitting the box panel member to move to a second position to connect the cab portion with the cargo load, so that an opening is formed to extend the cargo load, comprising hinges formed to allow the cab panel member and the box panel member to be respectively folded toward an inner side of the cab portion, the box panel member having a panel member supporting means for maintaining and fixing the box panel member in the first position.

2. The pick up truck of claim 1, further comprising a cab panel member locking means for locking the cab panel member thereby maintaining and fixing cab panel member in the first position.

3. The pick up truck of claim 1 or 2, further comprising a rear seat and a seat back portion disposed behind the driver's seat comprising seat folding means for rotating the rear seat and the seat back portion toward the inner side of the cab portion, to permit the box panel member to be positioned on the seat back portion.

4. The pick up truck of claim 1, wherein the panel member supporting means includes a stopper fixably mounted at one side of the box panel member to support the box panel member at one side opposite to a direction in which the box panel member is folded.

5. The pick up truck of claim 1, wherein the roof panel includes a fixing means consisting of a pair of hooks to maintain the opening in an open state in a state where the cab panel member is tightly folded.

6. The pick up truck of claim 2, wherein the cab panel locking means includes a locking member swingably mounted at the base of the roof panel, the locking member being configured to have more powerful fixed force at the location where it is closely contacted with the cab panel member and the swing location at both ends where the close contact is released.

7. The pick up truck of claim 1, further comprising weather strips disposed along the cab panel member and the box panel member to maintain tightness.

* * * * *